(12) United States Patent
Santelli, Jr.

(10) Patent No.: US 6,872,888 B2
(45) Date of Patent: Mar. 29, 2005

(54) UNIVERSALLY ADJUSTABLE WIRE AND/OR CABLE ENCLOSURE CONNECTOR FOR WIRE AND/OR CABLE ENCLOSURE SYSTEMS

(76) Inventor: Albert Santelli, Jr., 123 N. Mountain Ave., Bound Brook, NJ (US) 08805

( * ) Notice: Subject to any disclaimer, the term of this patent is extended or adjusted under 35 U.S.C. 154(b) by 0 days.

(21) Appl. No.: 09/871,315

(22) Filed: May 31, 2001

(65) Prior Publication Data

US 2002/0179312 A1 Dec. 5, 2002

(51) Int. Cl.[7] .............................. H02G 3/04; F16L 11/00
(52) U.S. Cl. ....................... 174/68.1; 174/48; 138/118; 138/121
(58) Field of Search .......................... 174/48, 49, 71 R, 174/72 R, 72 A, 95–97, 100–101, 34, 68.1, 68.2, 68.3, 70 R, 74 R, 74 A, 751; 138/118, 121, 156, DIG. 8; 52/287.1

(56) References Cited

U.S. PATENT DOCUMENTS

| | | | | |
|---|---|---|---|---|
| 1,668,953 A | * | 5/1928 | Erickson | 138/106 |
| 3,562,402 A | * | 2/1971 | Dwyer | 174/35 GC |
| 3,957,084 A | * | 5/1976 | Jung | 138/122 |
| 4,018,979 A | * | 4/1977 | Young | 174/35 C |
| 4,690,778 A | | 9/1987 | Narumiya et al. | |
| 4,727,908 A | * | 3/1988 | Forster | 138/120 |
| 4,783,279 A | * | 11/1988 | Petermann et al. | 252/503 |
| 4,792,312 A | * | 12/1988 | Yasumoto | 439/164 |
| 4,801,764 A | * | 1/1989 | Ohlhaber | 174/117 F |
| 4,875,871 A | * | 10/1989 | Booty et al. | 439/209 |
| 5,105,120 A | | 4/1992 | Nishioka et al. | |
| 5,235,136 A | * | 8/1993 | Santucci et al. | 174/101 |
| 5,283,393 A | * | 2/1994 | Guginsky | 174/102 R |
| 5,637,955 A | | 6/1997 | Ji | |
| 5,789,064 A | * | 8/1998 | Valente et al. | 174/35 R |
| 6,448,498 B1 | * | 9/2002 | King et al. | 174/99 R |
| 6,573,451 B2 | * | 6/2003 | Komiya et al. | 174/68.1 |

FOREIGN PATENT DOCUMENTS

| | | | | |
|---|---|---|---|---|
| GB | 2 088 515 | * | 11/1980 | F16L/55/00 |
| JP | 53-115927 | * | 10/1978 | F16L/11/11 |

* cited by examiner

Primary Examiner—William H. Mayo, III
(74) Attorney, Agent, or Firm—Duane Morris LLP

(57) ABSTRACT

A connector for connecting elongated enclosures of a wire and cable enclosure system, includes: a manually bendable pleated body having first and second ends; a first coupling member extending from the first end of the body, for attaching one of the elongated enclosures to the connector, and a second coupling member extending from the second end of the body, for attaching another one of the elongated enclosures to the connector. The pleated body allows the connector to be manually bent from side-to-side, manually bent from front-to-back, manually lengthened, or manually shortened to provide a desired configuration.

27 Claims, 4 Drawing Sheets

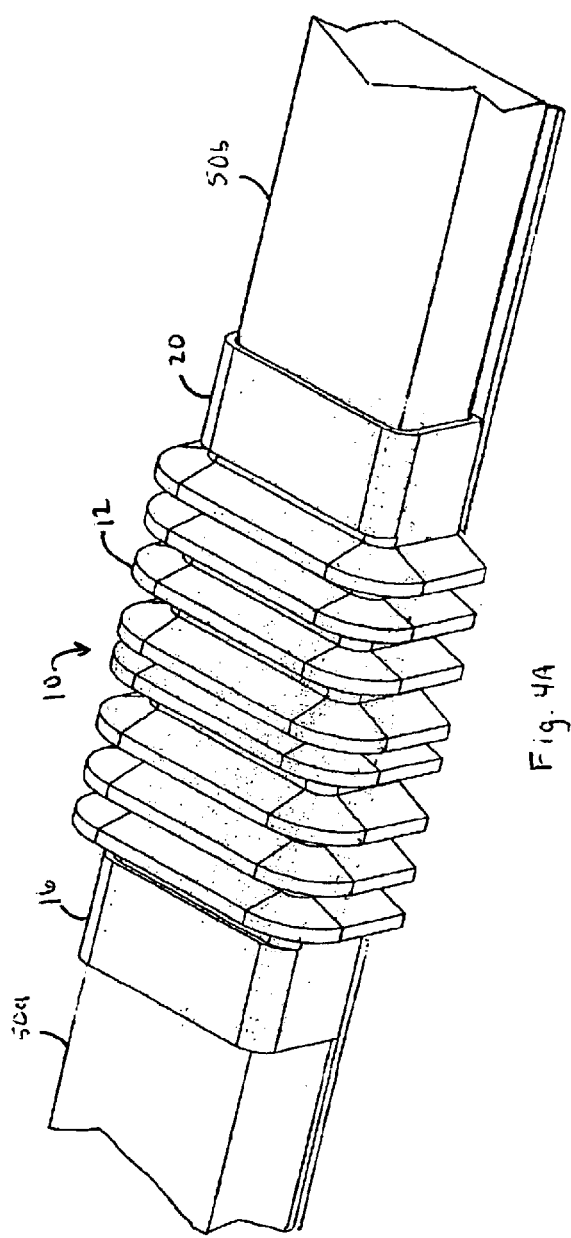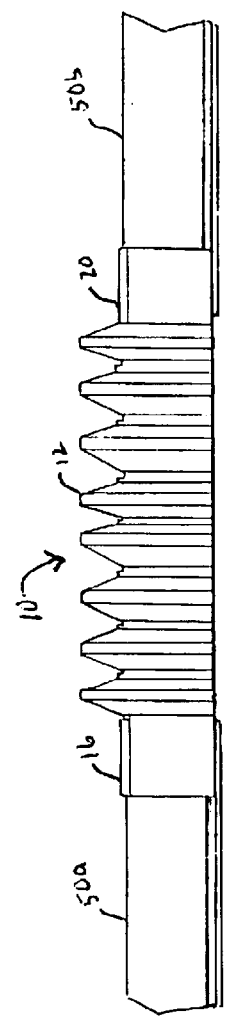

UNIVERSALLY ADJUSTABLE WIRE AND/OR CABLE ENCLOSURE CONNECTOR FOR WIRE AND/OR CABLE ENCLOSURE SYSTEMS

FIELD OF THE INVENTION

This invention relates to wire management, and more particularly, to a universally adjustable wire and/or cable enclosure connector for connecting elongated wire and/or cable enclosures of wire and/or cable enclosure systems such as wireways, ground wire guards, surface raceways, and other similar wire and/or cable enclosure systems.

BACKGROUND OF THE INVENTION

Wires and cables such as wire or fiber optic telephone lines, data cables, and power cables, to name a few, which extend along exposed surfaces of exterior or interior panels, walls, ceilings, floors of structures located in residential, commercial and industrial environments, electrical cabinets, and panels for equipment, are typically contained in various types of enclosures. These enclosures manage, mechanically protect and in some applications shield the wires from electromagnetic radiation.

One desirable method for enclosing wires and/or cables (collectively referred to hereinafter as "wire" or "wires") is to use molded or extruded plastic enclosure systems such as raceways and ducts. These enclosure systems typically include multiple elongated enclosure sections that are joined by connectors of various configurations, such as inside connectors, outside connectors, 90-degree-turn connectors, straight connectors and tee connectors. The connectors enable the elongated enclosure sections to be routed in various directions, e.g. around corners, etc., thus, adapting the enclosure system to a particular installation. Such enclosure systems provide good mechanical protection for the wires, are relatively inexpensive, and low in weight.

One problem associated with these enclosure systems concerns the connectors that are used for connecting elongated enclosure sections. More specifically, the variously configured connectors undesirably increase the cost of the enclosure system. Additionally, some installations may require the enclosure sections to be connected in a manner, which can not be accommodated by any of the existing connector designs.

Accordingly, a connector, for connecting wire enclosure sections of wire enclosure systems, is needed that can be universally adjusted to adapt the wire enclosure systems to most installations.

SUMMARY OF THE INVENTION

A connector for connecting elongated enclosures of a wire and/or cable enclosure system, comprises: a manually bendable pleated body having first and second ends; a first coupling member extending from the first end of the body, for attaching one of the elongated enclosures to the connector; and a second coupling member extending from the second end of the body, for attaching another one of the elongated enclosures to the connector. The pleated body allows the connector to be manually bent from side-to-side and/or front-to-back, and/or be manually lengthened or shortened to provide a desired configuration.

BRIEF DESCRIPTION OF THE DRAWINGS

The advantages, nature, and various additional features of the invention will appear more fully upon consideration of the illustrative embodiments now to be described in detail in connection with accompanying drawings where like numerals are used to identify like elements and wherein:

FIG. 4A is a perspective view showing the connector connecting two wire enclosure sections;

FIG. 4B is a side elevational view showing the connector connecting two wire enclosure sections;

It should be understood that the drawings are for purposes of illustrating the concepts of the invention and are not to scale.

DETAILED DESCRIPTION OF THE INVENTION

Figure 1:
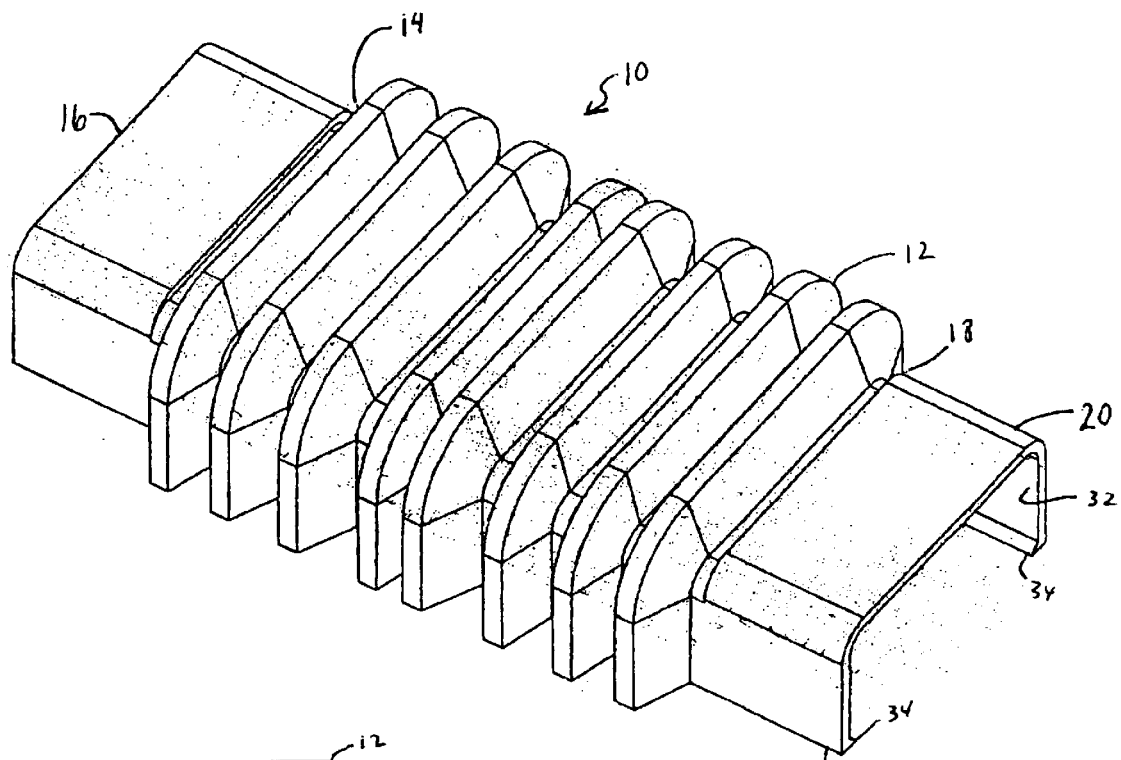
FIG. 1 is a perspective view of an exemplary embodiment of a connector made according to the invention.
Figure 2:
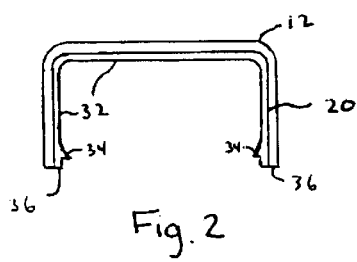
FIG. 2 is an end view of the connector of FIG. 1.
Figure 3:
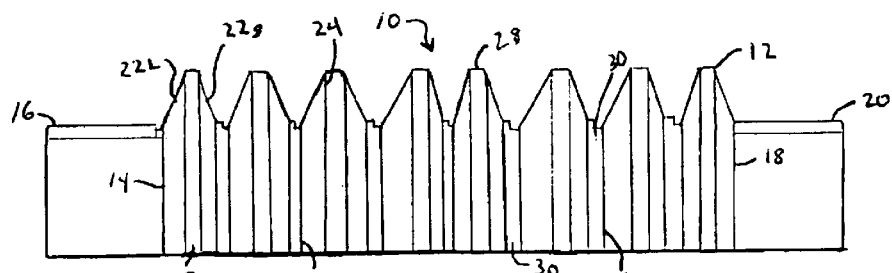
FIG. 3 is a side elevational view of the connector of FIG. 1.

FIGS. 1–3 collectively show an exemplary embodiment of a universally adjustable wire enclosure connector 10 made according to the principles of the invention. The connector 10 is especially intended for use in wire enclosure systems, including but not limited to wireways, ground wire guards, surface raceways, and other similar enclosure systems, that typically operate to manage, mechanically protect and in some applications electromagnetically shield various types of wires and/or cables. The connector is specifically used in these systems for mechanically connecting the elongated wire enclosures, which make up the systems.

Figure 5A:
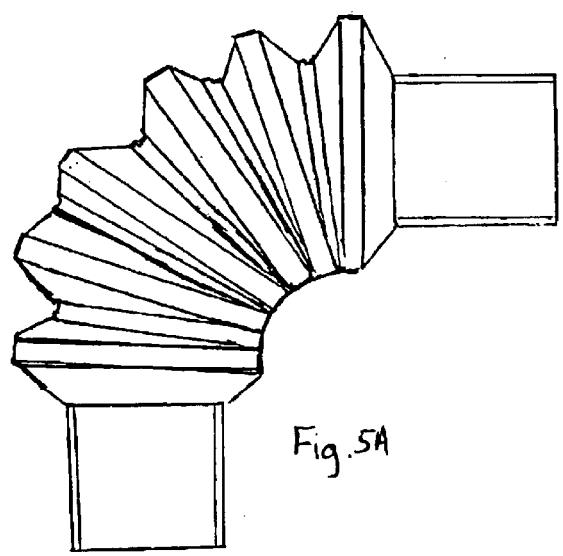
FIG. 5A is top plan view of the connector manually configured into a 90-degree-turn connector.
Figure 5B:
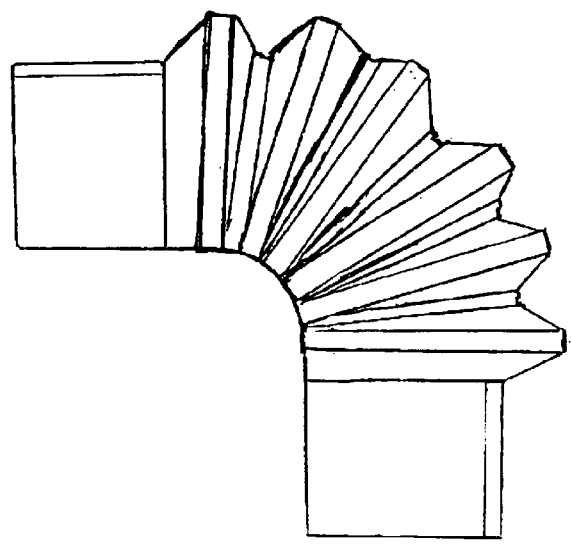
FIG. 5B is a side elevational view of the connector manually configured into a outside corner connector.
Figure 5C:
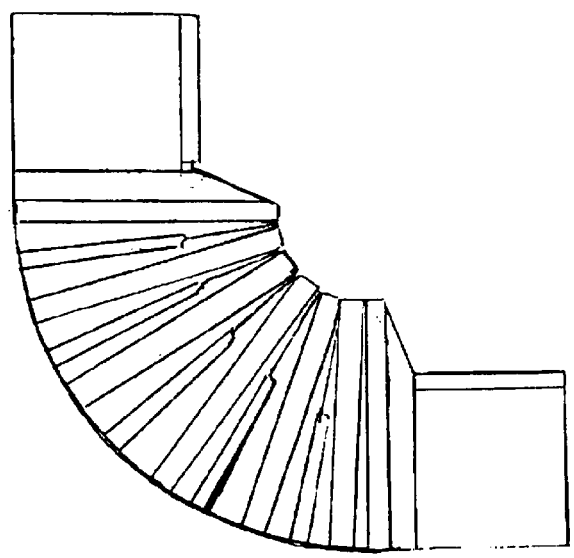
FIG. 5C is a side elevational view of the connector manually configured into a inside corner connector.

The connector 10 comprises a channel-like pleated body 12 with channel-like coupling members 16, 20 extending from first and second ends 14, 18 of the pleated body 12. The connector 10 is preferably constructed as a single-piece molded member, although the body 12 and coupling members 16, 20 may also be made separately and attached later on using conventional methods. The pleated body 12 allows the connector 10 to be manually bent from side-to-side and/or front-to-back, and/or be manually lengthened or shortened. The construction of the pleated body allows it to indefinitely maintain any configuration it is manually bent, lengthened, and/or shortened into, moreover, the construction of the pleated body permits it to be reconfigured numerous times. Accordingly, the connector can be manually configured into an inside corner connector (FIG. 5C), an outside corner connector (FIG. 5B), a 90-degree-turn connector (FIG. 5A), a straight connector (FIGS. 5A and 5B), etc, hence, providing universal adjustability.

As best shown in FIG. 3, the pleated body 12 may be embodied as an arrangement of long and short inverted U-shape pleats 22L, 22s. Each pleat 22L, 22s includes an outer peripheral edge 24 and an inner peripheral edge 26. The outer peripheral edges 24 of adjacent pleats 22L, 22s are hingedly attached to outer peripheral web members 28. The inner peripheral edges 26 of adjacent pleats 22L, 22s are hingedly attached to inner peripheral web members 30. This arrangement allows the pleats 22L, 22s to sequentially fold into and out of one another in a snap-folding manner similar to that of a conventional corrugated drinking straw, thus, enabling the connector 10 to be manually placed into a configuration one or more times as described earlier, and indefinitely maintain any such configuration.

The pleated body 12 may also be constructed with any other pleat arrangement that enables the connector 10 to be manually placed into a configuration one or more times as described earlier and indefinitely maintain any such configuration.

As shown in FIGS. 4A and 4B, the channel-like coupling members 16, 20 are typically constructed to conform to the shape of and snap-lock over the elongated wire enclosure sections 50a, 50b. Snap-lock engagement may be accomplished by providing opposing, inwardly projecting locking members 34 on the inner surfaces 32 of the coupling members 16, 20. The locking members 34 may be a segmented arrangement or be continuous as shown in FIG. 1. Further, the locking members may be integral with the longitudinal edges 36 of the coupling members 16, 20 as shown in FIG. 1, may be spaced from the longitudinal edges as shown in FIG. 2, or arranged in any other suitable opposing relationship.

The connector 10 may be made from polyvinyl chloride, thermoplastic nylons, polyethylene, polypropylene, polystyrene, acrylate resins, polyester resins, thermoplastic rubber and other like plastics. Inert additives materials such as calcium carbonate or talc which aid in the enclosure forming process can be added if desired. Additionally, the connector 10 can be made using any suitable well known plastic forming method.

The connector 10 may also be fabricated from a plastic composition having electromagnetic shielding properties as described in U.S. patent application Ser. No. 09/679,018 entitled, "Electrical Conductor Enclosures Having Electromagnetic Shielding Characteristics," assigned to the assignee herein. This application, which is incorporated herein by reference, describes plastic compositions for making wire enclosures. The compositions may include one or more components that enable enclosures to absorb and/or reflect electromagnetic waves. It may be very desirable to fabricate the connector 10 from such plastic compositions when using them to connect wire enclosures made from same or similar compositions.

Plastic compositions having electromagnetic shielding properties preferably include a plastic base material, a first component having electromagnetic absorbing properties and a second component having electromagnetic reflecting properties. Alternatively, electromagnetic shielding plastic compositions can include a plastic base material and a single component having either electromagnetic absorbing properties or electromagnetic reflecting properties. Connectors made from single component electromagnetic shielding plastic compositions will have reduced electromagnetic shielding characteristics as compared with enclosures made from the preferred two component plastic compositions.

The plastic base material used in the electromagnetic shielding plastic compositions can include polyvinyl chloride, thermoplastic nylons, polyethylene, polypropylene, polystyrene, acrylate resins, polyester resins, thermoplastic rubber and other like plastics. Inert additives materials such as calcium carbonate or talc which aid in the enclosure forming process can be added if desired.

The electromagnetic absorbing component used in the electromagnetic shielding plastic compositions typically comprise a sintered ferrite powder, such as manganese-nickel-zinc ferrite, manganese-zinc ferrite, nickel-zinc ferrite, barium ferrite, strontium ferrite or any other suitable ferrite powder or combination of ferrite powders. The electromagnetic reflecting component used in the electromagnetic shielding compositions can comprise a metal powder such as aluminum, copper, nickel, zinc, or any other suitable metal powder or combination of metal powders.

The ferrite powder particles are used in all the electromagnetic shielding plastic compositions for absorbing electromagnetic radiation that passes through the connector. The metal powder particles are used in all the electromagnetic shielding compositions for reflecting electromagnetic radiation, thus preventing the same from passing through the wall of the connector. When metal powder particles are used together with the ferrite powder particles as per the preferred electromagnetic shielding plastic compositions, the metal particles operate to hold the radiation in the walls of the connector longer by reflecting the radiation around within the walls. This in turn, affords the ferrite powder particles more time to absorb the radiation, therefore, increasing radiation absorption.

The electromagnetic shielding plastic compositions can be formulated by dissolving the powdered or granulated plastic material in a suitable solvent, and mixing into the dissolved plastic material the sintered ferrite powder and/or the metal powder. After mixing, the solvent is evaporated from the plastic mixture to obtain plastic coated ferrite particles and/or plastic coated metal particles, depending upon the composition. The plastic coated particles are then extruded into pellets which are composed of the electromagnetic shielding plastic composition. The connector is fabricated using the pellets as a feedstock material for molding the connector.

The electromagnetic shielding properties of the connector can be varied by increasing or decreasing the quantity of the component(s) in the electromagnetic shielding plastic composition. It should be understood, however, that there are limitations on the quantity of ferrite powder and/or metal powder used in the electromagnetic shielding plastic composition. If the quantity of ferrite powder and/or metal powder in the electromagnetic shielding plastic composition is too low, the electromagnetic shielding properties of the connector will be insufficient. Conversely, if the quantity of ferrite powder and/or metal powder in the electromagnetic shielding plastic mixture is too high, the molding process and mechanical strength of the connector will be substantially diminished. In the preferred two component electromagnetic shielding plastic composition, the ferrite powder typically comprises about 20–30 weight % of the composition and the metal powder typically comprises about 1–2 weight % of the composition.

Connectors fabricated from the two component electromagnetic shielding plastic compositions may have outer and/or inner surfaces which are textured to provide a plurality of individual reflective surfaces that increase reflection of electromagnetic radiation. This results in greater absorption of electromagnetic radiation which enhances the electromagnetic shielding characteristics of the connector. It is believed that the texture surface formations cooperate with the reflective metal particles in the plastic to maximize the amount time the impinging electromagnetic radiation is actually in the walls of the connector, hence, increasing the amount time the electromagnetic absorbing ferrite particles in the plastic have to absorb the electromagnetic energy.

Figure 6A:
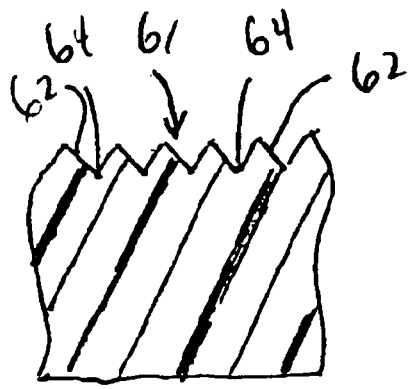
FIG. 6A is a sectional view through the connector illustrating a second type of textured surface formation.
Figure 6B:
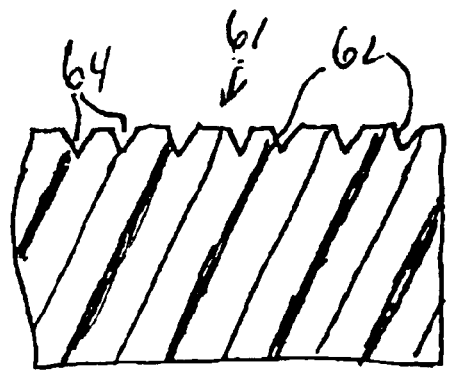
FIG. 6B is a sectional view through the connector illustrating a second type of textured surface formation.

Referring to FIGS. 6A and 6B, the reflective surfaces 62 of the texture surface formations 61 preferably comprise a first plurality of generally parallel v-shaped grooves 64 extending in a first direction and a second plurality of generally parallel v-shaped grooves 66 extending generally perpendicular to and crossing the first plurality of grooves 64. As shown in FIG. 6A, the grooves 64, 66 can be arranged immediately adjacent to one another in a saw-tooth configuration or spaced apart from one another as illustrated in FIG. 6B. In either arrangement, the walls of each groove 64, 66 are angularly disposed relative to one another, typically at an angle ranging between 30 and 90 degrees.

Although the connector 10 of the invention shown in drawings is adapted for connecting wire enclosure sections having generally rectangular cross-sections, the connector can be adapted for connecting wire enclosure sections having other cross-sectional shapes including but not limited to generally half-cylindrical or square cross-sections.

While the foregoing invention has been described with reference to the above embodiments, various modifications and changes can be made without departing from the spirit of the invention. Accordingly, such modifications and changes are considered to be within the scope of the appended claims.

What is claimed is:

1. A connector for connecting elongated enclosures of a wire and cable enclosure system, the connector comprising:
   a manually bendable pleated body having first and second ends, the pleated body including a plurality of pleats which fold into and out of one another;
   a first coupling member extending from the first end of the body, the first coupling member for attaching one of the elongated enclosures to the connector; and
   a second coupling member extending from the second end of the body, the second coupling member for attaching another one of the elongated enclosures to the connector;
   wherein the pleated body allows the connector to be manually bent from side-to-side, manually bent from front-to-back, manually lengthened, or manually shortened to provide a desired configuration, and wherein the pleated body and the coupling members define a channel which is longitudinally open along a side of the connector.

2. The connector according to claim 1, wherein the body and coupling members form a single-piece molded member.

3. The connector according to claim 1, wherein the body and coupling members are made from a plastic composition.

4. The connector according to claim 3, wherein the plastic composition includes a component with electromagnetic absorbing properties.

5. The connector according to claim 4, wherein the component comprises ferrite particles.

6. The connector according to claim 4, wherein the plastic composition further includes a second component with electromagnetic reflecting properties.

7. The connector according to claim 6, wherein the second component comprises metal particles.

8. The connector according to claim 3, wherein the plastic composition includes a component with electromagnetic reflecting properties.

9. The connector according to claim 8, wherein the component comprises metal particles.

10. The connector according to claim 1, wherein the body and coupling members are made from a plastic composition that provides electromagnetic shielding.

11. The connector according to claim 10, wherein at least one of the body and coupling members defines a textured surface which increases electromagnetic shielding.

12. The connector according to claim 11, wherein the textured surface is an exterior surface.

13. The connector according to claim 11, wherein the textured surface is an interior surface.

14. A wire and cable enclosure system comprising:
   elongated enclosures; and
   a connector comprising:
      a manually bendable pleated body having first and second ends, the pleated body including a plurality of pleats which fold into and out of one another;
      a first coupling member extending from the first end of the body, the first coupling member for attaching one of the elongated enclosures to the connector; and
      a second coupling member extending from the second end of the body, the second coupling member for attaching another one of the elongated enclosures to the connector;
      wherein the pleated body allows the connector to be manually bent from side-to-side, manually bent from front-to-back, manually lengthened or, manually shortened to provide a desired configuration, and wherein the pleated body and the coupling members define a channel which is longitudinally open along a side of the connector.

15. The enclosure system according to claim 14, wherein the body and coupling members of the connector form a single-piece molded member.

16. The enclosure system according to claim 14, wherein at least the connector is made from a plastic composition.

17. The enclosure system according to claim 16, wherein the plastic composition includes a component with electromagnetic absorbing properties.

18. The enclosure system according to claim 17, wherein the component comprises ferrite particles.

19. The enclosure system according to claim 17, wherein the plastic composition further includes a second component with electromagnetic reflecting properties.

20. The enclosure system according to claim 19, wherein the second component comprises metal particles.

21. The enclosure system according to claim 16, wherein the plastic composition includes a component with electromagnetic reflecting properties.

22. The enclosure system according to claim 14, wherein at least the connector is made from a plastic composition that provides electromagnetic shielding.

23. The enclosure system according to claim 21, wherein the component comprises metal particles.

24. The enclosure system according to claim 22, wherein at least the connector defines a textured surface which increases electromagnetic shielding.

25. The enclosure system according to claim 24, wherein the textured surface is an exterior surface.

26. The enclosure system according to claim 24, wherein the textured surface is an interior surface.

27. A connector for a wire raceway, the connector comprising a pleated body having first and second ends, the pleated body defining a channel which is longitudinally open along a side of the connector, the pleated body including a plurality of pleats which fold into and out of one another to allow the connector to be manually bent.

* * * * *